May 12, 1964   G. E. HILLIARD ETAL   3,132,854
HEARTH FURNACES AND THE METHOD OF MELTING THEREIN
Filed July 9, 1962

3,132,854
HEARTH FURNACES AND THE METHOD OF MELTING THEREIN

Glenn E. Hilliard, Pittsburgh, and Walter Mainwaring, Jr., New Kensington, Pa., assignors to Allegheny Ludlum Steel Corporation, Brackenridge, Pa., a corporation of Pennsylvania
Filed July 9, 1962, Ser. No. 208,213
17 Claims. (Cl. 263—43)

This invention relates to an improvement in means for and the method of selective application of heat to a melting hearth and, in particular, to an improvement in open hearth furnaces and the method of melting therein.

In utilizing open hearth furnaces for steel-making purposes, two methods are commonly employed in present day practice. One method is to charge all of the ferrous materials such as steel scrap, cast iron, pig iron and like materials onto the hearth of the furnace in solid state and to subject the charge to products of combustion to effect the melting thereof. The other commonly practiced method is to make up the charge supplied to the hearth from varying proportions of solid ferrous scrap and molten iron such as is obtained from the blast furnace or other molten iron producing facilities. Regardless of which method is utilized, the ferrous solids must be subjected to temperatures well above their melting point and such is usually accomplished in conventional open hearth practice by passing a high temperature products of combustion flame over the hearth and onto the charge of ferrous materials which are to be melted. Such high temperature flames are commonly produced by means of well known regenerative principles.

It has long been recognized that this method of fuel application to the open hearth furnace melting chamber has a low over-all unit thermal efficiency. This is evident when one considers the thermal requirement per unit of metallics melted with respect to the total thermal input actually used in effecting the melting of a given charge. Generally, it is considered that in melting a given charge of scrap and pig iron by the conventional regenerative open hearth furnace practive that an overall thermal efficiency of only from 22% to 28% is obtained.

In recent times, different attempts have been made to improve the open hearth furnace thermal efficiency. One of the most promising improvements is the oxy-fuel method which broadly encompasses the introduction of a fluid fuel in conjunction with high purity oxygen through a common burner so positioned within the furnace structure as to direct the products of combustion flame therefrom into close proximity to or onto the charge of solid material on the melting hearth. A discussion of the oxy-fuel method and of the burners therefor may be found beginning on page 67 of the February 1961 issue of Iron and Steel Engineer in an article entitled Oxy-Fuel Processes. In following the oxy-fuel method, the burner therefor is fixedly positioned through the refractory roof of the furnace in such a manner that the flame therefrom is directed vertically downward to impinge upon the charge of solid material positioned directly beneath the burner. In some cases, the burner is so mounted as to permit vertical movement thereof so as to raise or lower the burner to control the proximity of the flame therefrom with respect to the charge of solids positioned on the melting hearth. This vertical adjustment of the oxy-fuel burner, however, has not proven to be of too much value since there must always be a sufficient distance between the burner tip and the surface of the charge of solids to permit proper mixing of the oxygen and fuel to develop a flame of desirable characteristics. With proper adjustment of the ratio of oxygen to fuel and the velocity thereof, it is possible to produce a products of combustion flame having a temperature of the order of 4000° to 4500° F.

When such a high temperature flame impinges directly upon the charge of cold solids, the rate of heat transfer to the solids is exceptionally rapid thereby causing the solids to quickly reach their melting point. In practice, however, such high thermal efficiency occurs for a very short period of time for, with the burner mounted as referred to, the flame is directed onto only that small portion of the charge that is directly beneath the oxy-fuel burner with the result that a crater-like depression is formed in the charge of solids and the adjacent material forming the walls of such depression remain in a relatively cold state in relation to the melted material.

As is evident, the oxy-fuel method as known prior to this invention has a limited efficiency as used in the open hearth furnace and has usually been found to be unsatisfactory for the following reasons. With the formation of a pool of liquid metal in the crater-like depression, there is a definite decrease in the efficiency of the melting rate since there is a substantial decrease in the heat absorption rate by the metallic mass. This causes the molten pool and the metallic solids to reflect the intense heat of the flame to the refractory lining of the furnace with acompanying damage thereto. Further, since the burner is fixed, the point of flame impingement with respect to the furnace refractories is fixed to thereby cause constant attack and damage to a given area of the furnace structure with the result that frequent use of the fixed oxy-burner contributes to the premature failure of the refractory lining of the furnace. In addition, since the oxy-fuel burners are positioned to impinge the flame vertically downward therefrom onto solids charged through an associated charging port or door opening and in particular, the charging ports or doors adjacent the ends of the furnace, such oxy-fuel flames interfere with the flame entry from the usual end burners to cause the flame therefrom to be divided or split. When this occurs, the split flame from the end burner is diverted towards the side wall refractories of the furnace with the result that the thermal efficiency of the flame from the end burners is decreased and damage to the side wall refractories occurs.

In attempting to overcome the foregoing difficulty of flame interference, the oxy-fuel burner has been designed and utilized to provide for post mixing of the fuel and oxygen as they are ejected from the burner at very high velocity so as to produce a flame cone of relatively small diameter. Such practice, while providing some relief, does not completely overcome the problem of flame interference but instead is found to intensify the objectionable crater-like depressions in the solid charge since a smaller area of the charge is contacted by the relatively smaller cone diameter of the resulting flame.

In certain installations of conventional regenerative open hearth furnaces, a plurality of oxy-fuel burners have been fixedly mounted vertically through the roof of the furnace in close spaced relation to one another lengthwise of the furnace to supplement the normal thermal input and to provide substantial flame coverage throughout the entire length of the charge of solids on the melting hearth in an attempt to obtain a substantially even melting of the charge. In such cases, it has been found that the total thermal input of the burners is far beyond the limit that the refractories of the furnace can stand. Further, where the thermal input per burner is reduced so as to lower the total thermal input to protect the refractories, the resulting slower rate of heating and melting of the charge of solids defeats the purpose of the closely spaced vertical burners.

While the foregoing discussion is directed to criticisms of the known open hearth practice, it will also be appreciated that in any melting hearth practice it is substantially impossible to effect an even distribution by weight and volume of the charge of cold solids over the hearth area by conventional charging methods. Thus, because of the uneven build-up of the cold charge, it is highly desirable to provide some means to control the fuel application to the charge to selectively expose the areas of the large build-up to a more lengthy exposure to the flame than the other areas. Although this problem of uneven distribution of the charge and lack of selective control of the flame application thereto has existed since the beginning of melting hearth practice and has been accompanied with low thermal efficiency, no one prior to this invention has provided a solution to the existing melting hearth problem described hereinbefore.

An object of this invention is to provide for the selective application of flame to predetermined areas of large build-up of a charge of solids on a melting hearth.

Another object of this invention is to provide for the selective positioning of a vertical flame impingement on a charge of solids on a melting hearth to improve the thermal efficiencies of the melting practice.

A further object of this invention is to provide an open hearth furnace with a plurality of aligned vertical fuel burners that are adjustable lengthwise of the furnace to selectively vary the impingement of the flame of the products of combustion therefrom over the charge of solids that is to be melted.

Another object of this invention is to provide an open hearth furnace having a plurality of spaced vertical fuel burners disposed to extend downwardly through the roof of the furnace and having a movable supporting structure for each of the vertical fuel burners disposed for horizontal movement above the roof, the movable supporting structures being disposed for predetermined horizontal movement in response to actuating means to adjust the positioning of the vertical fuel burners relative to the charge to vary the area of impingement of the flame therefrom from one portion to another on the charge to be melted.

A further object of this invention is to provide for effecting the heating of scrap in an open hearth furnace by utilizing direct vertical flame impingement from a plurality of burners vertically disposed to extend through the roof of the furnace and to effect a predetermined movement of said burners to selectively move the direct vertical flame impingement therefrom to different portions of the charge and to selectively control the fuel stream to said burners to individually control the vertical flame impingement from one or more of said burners to effect an efficient melt-down of the charge.

Other objects of this invention will become apparent from the following description when taken in conjunction with the accompanying drawing in which.

Figure 1:
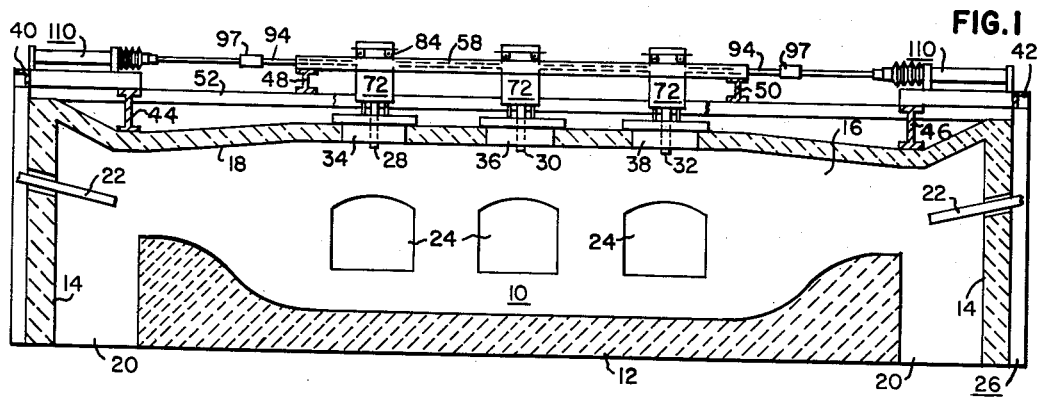
FIGURE 1 is a view in sectional elevation of a schematic representation of an open hearth furnace embodying the teachings of this invention.

Referring to the drawing and in particular to FIG. 1 thereof, this invention is illustrated by reference to a regenerative open hearth furnace 10 of well known design and which is provided with a hearth 12, end walls 14, side walls 16 and a roof 18 of refractory material and having conventional uptakes 20. As in common practice, conventional end fuel burners 22 project through the opposite end walls 14 being positioned to direct the flames therefrom over a charge (not shown) that is deposited through spaced charging doors or ports 24 in one of the side walls 16 onto the melting hearth 12. The charging ports 24 are so spaced that the charge of solids to be melted may be delivered to and distributed on the melting hearth 12 and are of a size to accommodate the standard charging boxes (not shown), it being understood that such ports 24 are provided with doors (not shown) which are normally closed except to admit the charging boxes to the furnace or to observe the progress of the melting of the charge. The distribution of the charge of solids is more or less governed by the size and spacing of the charging ports 24.

In the embodiment illustrated, a reinforcing framework 26 is disposed about the external dimensions of the furnace 10 and a portion of such framework is utilized over the roof 18 as a support for a plurality of spaced vertical oxy-fuel burners 28, 30 and 32 which are disposed to extend vertically downward through the roof 18 through fixed elongated firing ports 34, 36 and 38, respectively, of substantially rectangular shape. The oxy-fuel burners utilized are preferably those of the post-mixing type, such as the commercially available Linde Burner–AB–3, to provide the desired vertical flame although burners of the face-mixed or pre-mixed types may be utilized where the design of the burner and the discharge velocity therefrom is sufficient to propel the flame vertically downward as hereinafter described to effect an impingement on the charge of solids on the melting hearth. Thus, the framework 26, in addition to the normal supporting cross bars 40–42 and 44–46 (see FIGS. 1 and 2) at the opposite ends of the furnace, is provided with spaced cross bars 48 and 50 disposed between and secured to the upper longitudinal bars 52 and 54 of the framework 26 above the roof 18. A pair of spaced rail members 56 and 58 are carried on the cross bars 48 and 50, being disposed to extend longitudinally of and spaced above the roof 18 and adapted to support the spaced firing ports 34, 36 and 38.

Figure 4:
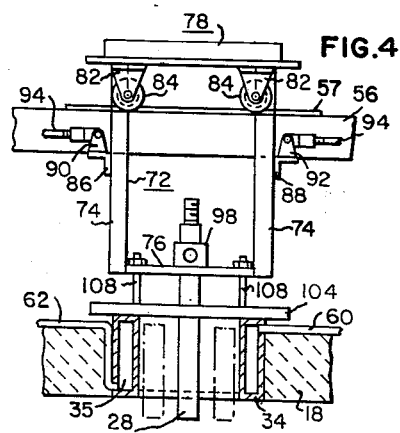
FIG. 4 is a view in side elevation of the equipment of FIG. 3.
Figure 5:
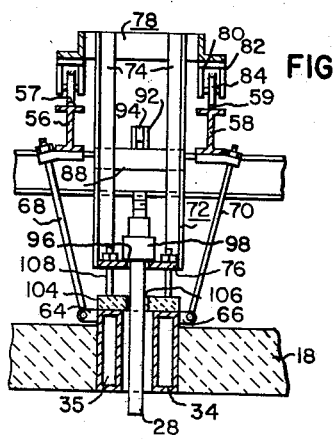
FIG. 5 is a view in end elevation and partly in section of the equipment of FIG. 4.

Referring to FIGS. 4 and 5, the firing port 34 is illustrated as being formed of rectangular shape and as having a hollow wall construction for forming a cooling chamber 35 so that when such chamber is connected as by means of pipes 60 and 62 to a recirculating supply (not shown) of coolant such as water, the port can withstand the temperatures encountered in service. Each of the ports 34, 36 and 38 are of identical construction and are disposed in alignment with their rectangular shape extending longitudinally of the roof 18, with each of the spaced firing ports in the embodiment illustrated being in substantial alignment relative to an associated one of the spaced charging ports 24 and with the openings in the ports 34, 36 and 38 being of a length substantially equal to the width of the charging doors or ports 24. It will be appreciated, however, that the firing port lengths may vary considerably so as to be longer or shorter than the width of the charging ports. It will also be appreciated that where, as in some open hearth practice, it is customary to throw or push portions of the charge lengthwise of the hearth so that the build-up of the solids is effected to one side or the other of a given charging port, that the positioning of the spaced firing ports relative to the associated charging ports will be adjusted to permit the direct flame impingement on the built-up portions of the charge of solids. The firing ports are provided with outwardly extending flanges 64 and 66 (see FIG. 5) adjacent the upper edge thereof which are connected to the rail members 56 and 58, respectively, as by means of tie rods 68 and 70, respectively, so as to maintain the firing ports in a supported operative relation extending through the refractory roof 18.

In order to movably support the oxy-fuel burners 28, 30 and 32 vertically in the firing ports 34, 36 and 38, respectively, each burner is carried by and supported from a movable carriage structure 72 that is mounted on the spaced rail members 56 and 58. The carriage structures 72 are identical in construction so reference will be made to the structure of only one of them as illustrated in FIGS. 3, 4 and 5. Thus, in this embodiment each of the structures 72 is formed of four spaced vertical corner angle members 74 which are secured to and extend vertically upwards from the corners of a base plate member 76 to a rectangular frame member 78 formed of angle iron to which they are secured as by welding. Depending downwardly from each of the two side portions of the frame member 78 are spaced pairs of spaced flange members 80 and 82 between which are mounted grooved roller members 84 disposed in rotatable supporting engagement on tracks 57 and 59 mounted on the spaced rail members 56 and 58, respectively. Angle bars 86 and 88 (see FIGS. 4 and 5) are disposed across the end corner angle members 74 intermediate the ends thereof and are secured thereto as by welding and are disposed to carry upwardly extending flange members 90 and 92 to which are pivotally secured connecting tie rods 94, the purpose of which will be explained more fully hereinafter. The connecting tie rods 94 of the adjacent pairs of carriage structures 72 are disposed to be connected as by means of turnbuckles represented at 93 in FIG. 2 and the end tie rods 94 of the end carriage structures 72 are disposed in sliding relation in guide blocks 95 mounted on the spaced cross bars 48 and 50, such end tie rods 94 being disposed to be connected by other turnbuckles represented at 97 to actuating means as will be referred to hereinafter. The turnbuckles 93 and 97 may be individually adjusted to control the connection between the carriage structures or to disconnect a given carriage structure or to disconnect the carriage structures from one or the other of the actuating means. The base plate 76 has an opening 96 centrally disposed therethrough for accommodating one of the vertically disposed burners 28, 30 or 32 therein and carries a collar 98 on its upper surface in alignment with the opening for securing and supporting such burner in its vertical operative position. Each of the burners has its oxygen and fuel passage ways (not shown) at the upper end thereof connected as by means of flexible conduits 100 and 102 (see FIG. 1) to suitable sources (not shown) of a metered flow of oxygen and fuel necessary to meet the heat requirements. The flow of oxygen and fuel to the individual burners 28, 30 and 32 may be readily controlled by the operator so as to selectively adjust the flame impingement therefrom or selectively cut off the flame impingement from one or more of the vertical burners.

Again referring to FIGS. 1, 4 and 5, in order to conserve the heat in the furnace 10 and to protect the carriage structures 72 from such heat, a cover 104 of refractory material is provided for each of the firing ports 34, 36 and 38. In this embodiment, the cover 104 is of a substantially rectangular shape and has a width to extend across the rectangular opening of the associated firing port and a length approximately twice the length of the rectangular opening in the associated firing port. The cover 104 is also provided with a centrally disposed opening 106 of a size to accommodate the associated burner and is supported from the base plate 76 of the carriage structure 72 in an operative closing sliding relation on the upper surface of the associated firing port as by means of four spaced tie rods 108. Thus, the vertically disposed burner and its associated cover for each of the firing ports are disposed to be simultaneously moved lengthwise of the rectangular opening in the associated firing port when the associated carriage structure is moved relative thereto as will be described hereinafter.

Figure 2:
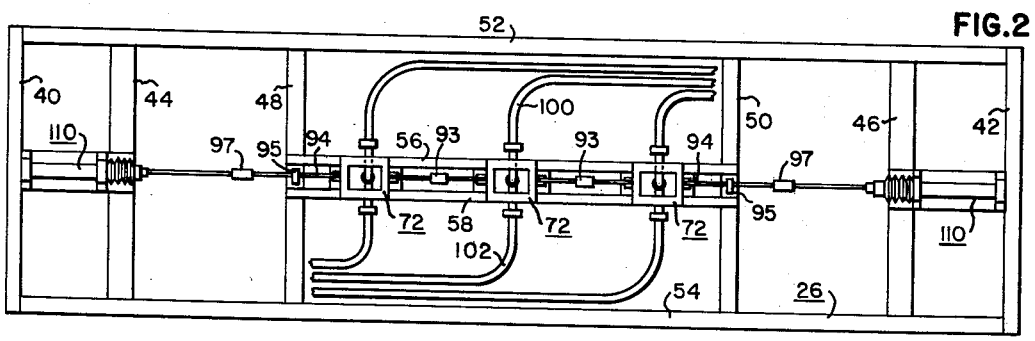
FIG. 2 is a top plan view of the furnace of FIG. 1.
Figure 3:
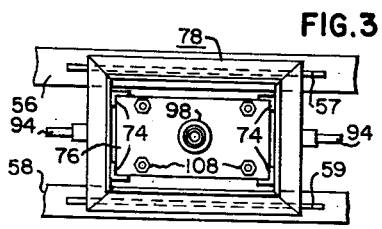
FIG. 3 is a top plan view, greatly enlarged, of a portion of the equipment shown in FIGS. 1 and 2.

Referring to FIGS. 1 and 2, an actuating means 110, represented as a fluid actuated piston assembly, is mounted on each pair of the normal spaced cross bars 40–42 and 44–46 of the framework 26 at the opposite ends of the furnace 10 above the roof 18 with the piston (not shown) thereof connected through the associated turnbuckle 97 to the end tie rod 94 of the adjacent end carriage structure 72. The piston assemblies 110 are disposed in opposition and in practice are connected to be oppositely energized from a suitable source (not shown) to effect a predetermined simultaneous directional movement of the plurality of connected spaced carriage structures 72 lengthwise of the furnace to simultaneously move the oxy-fuel burners 28, 30 and 32 and the covers 104 in one direction or the other, the movement of the oxy-fuel burners being lengthwise of and within the confines of their respective rectangular firing ports. While two of the actuating assemblies 110 are illustrated, such are used primarily as a precautionary measure in case of a breakdown of one of the assemblies, as it will be apparent that only one of the assemblies 110 is actually necessary to effect the predetermined movement of the connected carriage structures 72. In some instances, it may be desirable to operate one of the end carriage structures 72 independently of the other pair in which case the selected structure 72 is disconnected as by means of the turnbuckle 93 from the adjacent structure 72, and the associated actuating assembly 110 is then employed to effect movement of only the one selected carriage structure 72. The stroke of the piston (not shown) of each of the assemblies 110 can be readily controlled by the operator from a remote point to control the length and direction of the movement of the carriages 72 and, consequently, the simultaneous movement of the oxy-fuel burners and covers carried thereby relative to the lengthwise confines of the rectangular firing ports associated therewith, a representative change in the positioning of the burner 28 being shown in dash-dot outline in FIG. 4.

In operation, ferrous solids formed of steel scrap, iron scrap and pig iron are normally charged into the furnace 10 in incremental amounts as by means of well known charging boxes (not shown) being admitted through the charging ports 24 to build up a mass of solids on the hearth 12. Usually a predetermined amount of the ultimate charge of steel scrap is first admitted to the furnace, it being noted that the build up of such portion of the charge is necessarily, because of the limited size of the charging ports 24, in the vicinity of the charging ports but distributed across the hearth somewhat in alignment with the ports. It is also to be noted that the oxy-fuel burners 28, 30 and 32 terminate closely adjacent the roof of the furnace so that while they may be in alignment relative to the associated charging ports, they will not interfere with the movement of the charging boxes through the charging ports.

As soon as charging of the predetermined amount of the cold charge of steel scrap onto the hearth 12 is started, one of the end burners 22 is ignited and fuel is supplied therethrough from a suitable source of supply (not shown) at a predetermined rate to maintain the furnace system at high temperature level and the burners 22 are thereafter alternately fired to conform with the normal reversal of the regenerative cycles of the open hearth furnace. Once the end burners 22 are placed in operation, oxygen and fuel are supplied to the oxy-fuel burners 28, 30 and 32 at a predetermined rate to provide a vertically downward discharge therefrom of a flame of intense heat onto the solid charge immediately beneath the respective vertical burners. As the charge beneath the vertical flame impingement becomes heated and the bulk thereof is reduced a predetermined amount, the actuating assemblies 110 are operated to simultaneously move the connected carriage structures 72 lengthwise of the furnace roof to move the covers 104 and the oxy-fuel burners carried thereby lengthwise of the rectangular firing ports from a central position therein to one or the other of the positions illustrated in dash-dot outline in FIG. 4 or to intermediate positions therebetween to direct the vertical flame impingement to another portion of the charge of solids on the hearth. This lengthwise movement of the oxy-fuel burners is periodically continued to move the flame impingement of the vertical burners over the piled-up charge on the hearth to progressively and selectively subject substantially all of the surface thereof to direct vertical flame impingement to cause the bulk mass of the charge to become heated and reduced in size quite rapidly with a resultant high thermal efficiency factor.

It will be appreciated that movement of the vertical burners is controlled by the operator of the furnace and that such movement is not a continuous movement but is so controlled that heating and a partial melt down at a particular point is effected. Such partial melt down or reduction in bulk is limited to that amount just sufficient to prevent cratering in the charge at which point the vertical burners are moved to direct the vertical flame impingement to another portion of the charge so that heating and reduction of the volume bulk with slight or partial melting of the charge is continuous and a high thermal efficiency is maintained.

As the initial charge is heated and reduced in size as described, additional increments of the charge of solids are progressively added through the charging ports 24 as by means of the charging boxes. In such cases, the carriage structures 72 are simultaneously actuated as previously described to move the vertical oxy-fuel burners to one side or the other relative to the charging ports so that the flame impingement on the charge will not be interrupted as the charging box is admitted to the furnace and the new supply of cold solids are added to the melting hearth. By transferring the vertical flame impingement in this manner, a mass reduction of the cold charge is effected in a manner to effect a substantially even contour reduction of the surface of the mass without creating the crater-like depressions therein, such reduction in the bulk of the charge and partial melting making it possible, because of the faster and substantially even contour partial melting, to afford room more quickly to make the required incremental additions of the cold scrap to the melting hearth.

As a specific example of melting in an open hearth furnace constructed and operated in accordance with this invention and having a construction substantially as illustrated in the drawings, that is, the furnace is of the regenerative type and is equipped with three charging ports 24 and three of the vertical oxy-fuel burners, and operating the furnace on the cold charge practice, all ferrous materials are charged in the solid state. Such charge, for example, in a given furnace constitutes a total weight of 380,000 pounds of which 270,000 pounds is steel scrap and 110,000 pounds is iron scrap and pig iron. The steel scrap is charged prior to the iron addition, the charge being added in increments as reduction in the size of the mass is being effected because of space limitations of the melting hearth. Throughout the charging period, the furnace is fired by means of the conventional end burners 22 alternatively on fuel stream to conform with the normal reversal of the regenerative cycles with an input of 60,000,000 B.t.u. per hour being maintained therefrom. As the initial charge is built up, the vertical oxy-fuel burners are fired to produce a total of 40,000,000 B.t.u. per hour therefrom to augment the heat from the end burners whereby a total thermal input of 100,000,000 B.t.u. per hour is obtained. The oxy-fuel burners (sometimes referred to as "traveling" burners) are moved as described hereinbefore from point to point with respect to the surface of the charge to selectively subject different portions of the surface of the steel scrap charge to direct vertical flame impingement throughout the entire changing of the solids of the steel scrap to the furnace. In making 130 heats of the size indicated and using a solids charging rate input of approximately 120,140 pounds per hour, melt down of the steel scrap portion of the charge to the degree desired and usually obtained before making the iron additions was accomplished in an average time of three hours and ten minutes with an average total thermal input during that time of 316,300,000 B.t.u. Where reference is or has been made herein to the melt down of the steel scrap prior to making the iron additions, it is to be understood that by such "melting" or "melt down" we mean that condition normally effected in open hearth practice of reducing the steel scrap to the form of a highly heated compact mass approaching the molten condition but with only a small portion of the whole actually molten. This condition is desirable for effectively reducing the volumetric bulk of the cold scrap charge to a heated compact mass to permit faster additions of increments of the cold charge to be made thereto. The use of the vertical oxy-fuel burners may be discontinued after the melt down of the steel scrap and as the iron additions are made to the furnace as such melt down is the period during which this invention is most useful in improving the thermal efficiency of the open hearth practice. Where desired, however, the use of the vertical burners may be continued during the charging of the iron additions so as to aid in the complete liquefaction state of the total charge of the cold solids.

As contrasted to the results obtained with the furnace embodying this invention, in the same furnace but without the benefit or use of the vertical flame impingement from the traveling vertical oxy-fuel burners, it was found that in making 130 heats of the same size and of the same materials in the proportions atated, the average time for reducing the steel scrap to a highly heated compact mass was four hours and twenty minutes with a charging rate of 87,770 pounds per hour, such heating requiring an average total thermal input of 368,300,000 B.t.u. It is thus seen that the use of the present invention as compared to prior standard regenerative open hearth practice in reducing the steel scrap to the desired heated compact mass effected an increased over-all unit thermal efficiency by approximately 14% with an increase in the steel scrap solids charging rate of about 36% to provide a similar proportional increase in the unit steel-making productivity of the furnace.

In practice, the vertical oxy-fuel burners are usually employed as stated hereinbefore in cooperating with the end burners in effecting a fast and efficient reduction of the bulk of the steel scrap portion of the total charge. The iron portion of the charge can usually be efficiently reduced in bulk by the heat of the highly heated mass of the steel scrap and the heat supplied by the operation of the end burners, the input of which may be increased during the reduction of the mass of the iron additions. It will, of course, be obvious that instead of adding the iron portion of the charge in the form of cold solids, such iron portion may be added in the form of hot metal following the step of reducing the volumetric bulk of the steel scrap as taught herein in which case there would be no necessity to continue the operation of the vertical burners as such hot metal is charged onto the hearth.

While reference has been made hereinbefore to the efficiencies accomplished by effecting a fast reduction of the volumetric bulk of the steel scrap where the vertical oxy-fuel burners are used as described, the traveling burners have an additional advantage in that the burners can be moved longitudinally of the furnace away from the end burner flame in operation during a given period of the regenerative cycle to thereby minimize interference of the vertical flame impingement with the path and function of the flame from the end burner. Further, by providing for simultaneous movement of the covers 104 and the vertical oxy-fuel burners associated therewith, the openings of the rectangular firing ports through which the burners extend are continuously covered to limit the loss of heat therefrom and to prevent updrafts therethrough and accompanying erosive wear and flame distortion while protecting the equipment carried above the roof of the furnace.

While this invention has been described with reference to an open hearth furnace having three charging ports and three movable vertical oxy-fuel burners, it will be obvious that the number thereof may be varied depending upon the size of the furnace and the longitudinal area of the charge on the hearth that it is desired to subject to the direct vertical flame impingement. It will also be obvious that the operator may control the operation of the vertical oxy-fuel burners so as to shut off one or more of the burners or to so regulate the flow of oxygen and fuel to one or more of the burners as to regulate the thermal input thereof to the charge. Control of the movement and operation of the vertical burners is usually effected by the operator after visual examination of the melt down is had through the charging ports as additional increments of the charge are added to the melting hearth, although in actual practice the vertical burners are usually moved to one side or the other at all times during a charging operation depending upon the direction of emptying the charging box in the furnace.

By utilizing this invention, the thermal efficiency of the melt down period of the open hearth furnace is greatly increased with a resulting decrease in the melt down time and without any undue wear or erosion of the refractories of the furnace with the result that the output of the furnace is greatly increased with an overall savings in the production costs.

While this invention has been described herein by reference to an open hearth furnace and in particular to one of the regenerative type, it will be obvious that the invention is applicable to any type of melting hearth practice where one or more of the traveling burners may be installed to direct the vertical flame impingement directly onto the charge of solids and where the traveling burner may be actuated to predetermined positions to selectively direct the vertical flame impingement therefrom to different portions of the charge of solids to effect a fast and efficient reduction in the volumetric bulk thereof.

Further, it is to be noted that where a plurality of the vertical burners are utilized, it may be desirable to operate each burner individually to effect the selective flame impingement therefrom onto the charge of solids instead of effecting a simultaneous operation thereof. In such case each carriage structure may be individually connected to a separate actuating mechanism therefor or the carriage structures may be connected in any predetermined combination for simultaneous operation. Thus, as illustrated in FIG. 6 there is schematically shown a connecting linkage mechanism that may be utilized in effecting independent movement of individual carriage structures or movement of different combinations of the carriage structures or the simultaneous movement thereof.

Figure 6:
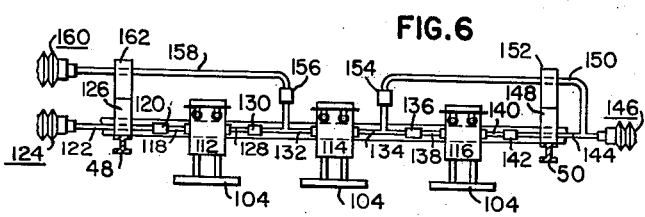
FIG. 6 is a schematic view in side elevation and with parts removed illustrating another embodiment of a portion of the equipment of FIG. 1.

As illustrated in FIG. 6, three of the movable carriage structures 112, 114 and 116 are utilized as in the embodiment of FIGS. 1 and 2. In this embodiment, carriage structure 112 is provided with a tie rod 118 disposed to be connected by a turnbuckle 120 to the end of piston rod 122 of an actuating mechanism 124, it being noted that rod 122 extends through the guide block 126. The other tie rod 128 of the structure 112 is disposed to be connected through turnbuckle 130 to tie rod 132 of carriage structure 114, the other tie rod 134 of which is disposed to be connected by turnbuckle 136 to the tie rod 138 of the carriage structure 116. Similarly, the other tie rod 140 of structure 116 is disposed to be connected by turnbuckle 142 to the piston rod 144 of the actuating assembly 146 such piston rod 144 being disposed for sliding movement in the guide block 148. In this instance, the rod 144 is fixedly connected to the end of another tie rod 150 slidably disposed in a guide block 152 mounted on top of guide block 148, the other end of tie rod 150 being disposed to be connected as by turnbuckle 154 to tie rod 134 of the carriage structure 114. The other tie rod 132 of structure 114 is also disposed to be connected through turnbuckle 156 to the piston rod 158 of a third actuating assembly 160, it being noted that the piston rod 158 is slidably mounted in a guide block 162 mounted on top of guide block 126.

With the structure as shown in FIG. 6, if it is desired to effect simultaneous movement of the carriage structures 112, 114 and 116 and to use both of the actuating means 124 and 146, only turnbuckle 156 need be actuated to disconnect piston rod 158 from tie rod 132. If it is desired to effect the independent movement of carriage structure 116 and simultaneous movement of carriage structures 112 and 114, turnbuckles 156, 154 and 136 are actuated to a disconnect position with turnbuckles 120, 130 and 142 remaining in connecting positions. If independent movement of carriage structure 112 and simultaneous movement of carriage structures 114 and 116 is desired, only turnbuckles 156 and 130 need be actuated to their disconnect positions, the other turnbuckles 120, 136, 154 and 142 remaining connected as shown. However, if independent movement of each of the carriage structures 112, 114 and 116 is desired, turnbuckles 130, 154 and 136 are actuated to their disconnect positions with turnbuckles 120, 156 and 142 being in connect position whereby actuating mechanism 124 controls movement of carriage structure 112, actuating mechansm 160 controls movement of carriage structure 114 and actuating mechanism 146 controls movement of carriage structure 116. The foregoing is illustrative of the type of releasable interconnections that may be provided for a plurality of the movable carriage structures where independent movement of any one or all of such structures may be desired, it being noted that the different disconnect tie rods may be either unscrewed from their connection in the pivotal mountings 90 or 92 (see FIG. 4) or may be pivotally raised to be secured as by means of hooks (not shown) to the associated carriage structure so as not to interfere with the desired independent movement.

While this invention has been described with reference to different specific embodiments, it is not to be limited thereto except as set forth in the appended claims as any one skilled in the art can readily reproduce this invention in different forms for application to hearth melting practice.

We claim:

1. In a furnace having a melting hearth for receiving a charge of solids to be melted and a roof thereover, the improvement comprising, an elongated firing port disposed lengthwise of and extending through said roof over said hearth, a fuel burner disposed to extend vertically through said elongated firing port, a movable carriage structure associated with and disposed to carry said vertical fuel burner, means for supporting said movable carriage structure above said roof for horizontal movement relative thereto, a cover for said firing port, said cover having an opening therethrough of a size for receiving and accommodating said vertical fuel burner as the burner extends through said firing port, means securing said cover to said movable carriage structure to be supported therefrom, and actuating means connected to said movable carriage structure disposed to be actuated to effect a predetermined horizontal movement of said carriage structure and said cover and said vertical burner carried thereby to move said vertical burner in said elongated firing port lengthwise thereof relative to the charge to be melted, said cover being of a size to cover said elongated firing port for all positions of said vertical fuel burner therein.

2. The combination as claimed in claim 1 including, at least a pair of spaced roller members carried by said movable carriage structure, and a pair of spaced substantially parallel rail members included as a part of said supporting means, said spaced roller members being disposed in seated supporting rolling relation on said spaced rail members to facilitate said horizontal movement of said carriage structure.

3. In an open hearth furnace having a hearth, roof, side and end walls forming a melting chamber for receiving a charge to be melted and having spaced charging ports in one of said side walls, the improvement comprising, elongated firing ports disposed in lengthwise alignment with and in spaced relation to one another to extend through said roof, a fuel burner for each of said elongated firing ports disposed to extend therethrough, a movable structure associated with and disposed to carry each of said fuel burners and maintain the axes of said burners in a generally vertical position at a fixed constant angle with respect to said hearth during operation, means for supporting each of said movable structures above said roof for horizontal movement relative thereto, and actuating means connected to said movable structures for effecting a predetermined horizontal movement thereof on said supporting means to move said spaced vertical fuel burners a predetermined amount lengthwise of and in said elongated firing ports to thereby selectively adjust the positioning of said vertical fuel burners lengthwise of the furnace relative to the charge to be melted.

4. The combination as claimed in claim 3 including, at least a pair of spaced roller members carried by each of said movable carrying structures, and a pair of spaced substantially parallel rail members included as a part of said supporting means, said spaced roller members being disposed in seated supporting rolling relation on said rail members to facilitate said horizontal movement of said carrying structures.

5. The combination as claimed in claim 3 including, at least a pair of spaced roller members carried by each of said movable carrying structures, said roller members being disposed in seated supporting rolling engagement with said supporting means to support said carrying structures for said horizontal movement relative to said roof, and releasable means disposed to rigidly connect said movable carrying structures together and to said actuating means to render said carrying structures simultaneously responsive thereto to effect the simultaneous horizontal movement thereof.

6. The combination as claimed in claim 3 including, a cover for, and disposed to extend over, each of said elongated firing ports, each of said covers having an opening therein through which one of said vertical fuel burners extends into said covered elongated firing port, means connecting each of said covers to one of said movable structures for simultaneous horizontal movement therewith as said vertical fuel burner is moved lengthwise of the furnace, each of said covers being of a size to cover its associated elongated firing port for all positions of said vertical fuel burner therein.

7. In an open hearth furnace having a hearth, roof, side and end walls forming a melting chamber for receiving a charge to be melted and having spaced charging ports in one of said side walls and fuel burners extending through said end walls, the improvement comprising, substantially rectangular firing ports disposed in lengthwise alignment with one another to extend through said roof and spaced in substantial alignment relative to said charging ports, said rectangular firing ports including means for effecting the cooling thereof, a fuel burner for each of said rectangular firing ports disposed to extend downward therein to direct products of combustion onto said charge to be melted, a movable structure disposed to support each of said fuel burners in its said rectangular firing port and maintain the axes of said burners in a generally vertical position at a fixed constant angle with respect to said hearth during operation, means for supporting each of said movable structures above said roof for horizontal movement relative thereto, means connecting said rectangular firing ports to said supporting means to maintain said rectangular firing ports in assembled relation in said roof, and actuating means connected to said movable structures and disposed to be actuated for effecting a predetermined horizontal movement of said movable structures on said supporting means to move said spaced vertical fuel burners a predetermined amount lengthwise of and in said rectangular firing ports to thereby selectively adjust the positioning of said vertical fuel burners and the products of combustion therefrom lengthwise of the furnace relative to the charge to be melted.

8. The combination as claimed in claim 7 including, a cover for, and disposed to extend over, each of said rectangular firing ports, each of said covers having an opening therein through which one of said vertical fuel burners extends into said covered rectangular firing port, each of said covers being supported in an operative covering position by one of said movable supporting structures for simultaneous horizontal movement therewith as said vertical fuel burner is moved lengthwise of the furnace, each of said covers being of a size to cover one of said rectangular firing ports for all positions of said vertical fuel burner therein.

9. The combination as claimed in claim 7 including, at least a pair of roller members carried in spaced relation by each of said movable supporting structures, and a pair of substantially parallel rail members included as a part of said supporting means, said rail members being disposed in a spaced horizontal relation lengthwise above said roof for receiving said spaced roller members in supporting relation thereon to facilitate said horizontal movement of said movable supporting structures to selectively position said vertical fuel burners in said rectangular firing ports.

10. The combination as claimed in claim 7 including, a cover for, and disposed to extend over, each of said rectangular firing ports, each of said covers having an opening therein through which one of said vertical fuel burners extends into said covered rectangular firing port, each of said covers being supported in an operative covering position by one of said movable supporting structures and disposed for simultaneous horizontal movement therewith, each of said covers being of a size to cover one of its associated rectangular firing ports for all positions of said vertical burner therein, at least a pair of roller members carried in spaced relation by each of said movable supporting structures, and a pair of substantially parallel spaced rail members included as a part of said supporting means and disposed lengthwise of and above said roof to receive said spaced roller members in supporting relation thereon to facilitate said horizontal movement of said movable supporting structures when actuated by said actuating means.

11. In the method of melting a charge of ferrous solids on a melting hearth having a roof thereover, the improvement comprising, directing an oxy-fuel flame downwardly from a movable burner disposed to extend through an elongated firing port in said roof to effect a direct flame impingement of high heat intensity upon the charge, and effecting a predetermined movement of said burner lengthwise of said elongated firing port and maintaining the axis of said burner in a generally vertical position at a fixed constant angle with respect to said hearth during operation to selectively move the direct vertical flame impingement to different portions of the charge to effect an efficient reduction in the volumetric bulk of said charge.

12. In the method of melting a charge of ferrous solids in an open hearth furnace, the improvement comprising, directing a plurality of melting flames downwardly from spaced movable burners disposed to extend through spaced elongated firing ports in the roof of the furnace to effect a direct flame impingement upon the charge, and effecting predetermined movements of said burners lengthwise of said elongated firing ports and maintaining the axes of said burners in a generally vertical position at a fixed constant angle with respect to said hearth during operation to selectively move the direct vertical flame impingement therefrom to different portions of the charge to effect an efficient reduction in the volumetric bulk of said charge.

13. In the method of melting a charge of ferrous solids in an open hearth furnace, the combination comprising, directing a plurality of melting flames downward from spaced movable burners disposed to extend through covered spaced elongated firing ports in the roof of the furnace to effect a direct flame impingement upon the charge, and effecting predetermined movements of the covers of said ports and said burners lengthwise of said spaced elongated firing ports and maintaining the axes of said burners in a generally vertical position at a fixed constant angle with respect to said hearth during operation to maintain said ports covered while selectively moving the direct vertical flame impingement from said burners to different portions of the charge to effect an efficient reduction in the volumetric bulk of said charge.

14. In the method of melting a charge of ferrous solids in an open hearth furnace of the regenerative type having end burners disposed to be selectively operated for selectively directing flame longitudinally of the furnace during melting down of the charge, the improvement comprising, simultaneously with the selective operation of the end burners directing a plurality of flames downwardly from spaced movable overhead burners disposed to extend through firing ports in the roof of the furnace to effect direct flame impingement upon the charge to reduce the volumetric bulk thereof and initiate melting in the region of said impingement, selectively moving said overhead burners a predetermined amount in said ports to discontinue the direct impingement in said regions after melting of the charge has commenced in said regions but before detrimental craters are formed therein, and moving said direct flame impingement to different regions of the charge, periodically effecting said predetermined movement of said overhead burners to select different portions of the charge to maintain flame impingement thereon while maintaining the selective operation of the end burners until the entire charge is at least partially liquified.

15. The method of claim 14 wherein the charge of ferrous solids includes steel scrap and iron and wherein the steel scrap is charged and melted down prior to the charging of the iron.

16. In the method of melting a charge of ferrous solids in an open hearth furnace of the regenerative type having end burners disposed to be selectively operated for selectively directing flame longitudinally of the furnace for effecting a reduction in volumetric bulk and melt-down of said charge, and in which said ferrous solids are added in increments prior to incremental additions of iron whereby relative high bulk portions of said charge are generated by said incremental additions, the improvement comprising, simultaneously with the selective operation of the end burners directing at least one flame downwardly from an overhead burner disposed to extend through a firing port in the roof of the furnace to effect direct flame impingement on the charge to reduce the volumetric bulk thereof and initiate melting in the region of said impingement, selectively moving each overhead burner a predetermined amount in said port to discontinue the direct impingement in said region after melting has commenced but before detrimental craters are formed therein, and moving said direct flame impingement to a different region of the charge, periodically effecting said predetermined movement of each overhead burner to select different portions of the charge to maintain flame impingement thereon while maintaining selective operation of the end burners until the entire charge is at least partially liquified.

17. In an open hearth furnace having a hearth, roof, side and end walls forming a melting chamber for receiving a charge to be melted, the improvement comprising, an elongated firing port in said roof, a fuel burner disposed to extend through said port, a movable structure disposed to carry said burner and maintain the axis of said burner in a generally vertical position at a fixed, constant angle with respect to said hearth during operation of said burner, means for supporting said movable structure above said roof for horizontal movement, and actuating means connected to said movable structure for effecting a predetermined horizontal movement thereof on said supporting means to move said fuel burner a predetermined amount lengthwise of and in said elongated firing port to thereby selectively adjust the position of said fuel burner lengthwise of the furnace relative to the charge to be melted.

References Cited in the file of this patent
UNITED STATES PATENTS

| | | |
|---|---|---|
| 2,084,830 | Barnard et al. | June 22, 1937 |
| 2,175,182 | Ditto | Oct. 10, 1939 |
| 2,671,987 | Jendrisak | Mar. 16, 1954 |

FOREIGN PATENTS

| | | |
|---|---|---|
| 827,718 | France | Jan. 28, 1938 |
| 881,432 | Great Britain | Nov. 1, 1961 |
| 1,214,500 | France | Nov. 9, 1959 |